(12) United States Patent
Smith et al.

(10) Patent No.: US 12,353,268 B2
(45) Date of Patent: Jul. 8, 2025

(54) HIGH-ENERGY MANAGEMENT SYSTEM

(71) Applicant: The Boeing Company, Arlington, VA (US)

(72) Inventors: Lori S. Smith, Orting, WA (US); Philip R. Specht, Cypress, CA (US); Anilise K. Larden, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 142 days.

(21) Appl. No.: 18/453,604

(22) Filed: Aug. 22, 2023

(65) Prior Publication Data

US 2025/0068230 A1 Feb. 27, 2025

(51) Int. Cl.
*G06F 1/26* (2006.01)
*G06F 1/32* (2019.01)
*G06F 1/329* (2019.01)
*G06F 1/3296* (2019.01)

(52) U.S. Cl.
CPC ............ *G06F 1/3296* (2013.01); *G06F 1/329* (2013.01)

(58) Field of Classification Search
CPC .... G06F 1/3296; G06F 1/329; H02J 2310/44; H02J 2310/52; H02J 13/00004; H02J 1/14

See application file for complete search history.

(56) References Cited

U.S. PATENT DOCUMENTS

| 10,822,107 | B1 | 11/2020 | Sheffield et al. | |
|---|---|---|---|---|
| 2010/0207728 | A1* | 8/2010 | Roscoe | H02J 3/14 700/295 |
| 2021/0376606 | A1* | 12/2021 | Belur | G06Q 50/06 |
| 2023/0291206 | A1* | 9/2023 | Winter | G05B 19/042 |

FOREIGN PATENT DOCUMENTS

AU 2019202757 A1 11/2019

OTHER PUBLICATIONS

European Patent Office Extended Search Report, dated Jan. 27, 2025, regarding Application No. EP24187918.8, 7 pages.

* cited by examiner

*Primary Examiner* — Xuxing Chen
(74) *Attorney, Agent, or Firm* — Yee & Associates, P.C.

(57) ABSTRACT

Technology provides for controlling a high-energy management system for an aircraft that includes receiving sensor data from a plurality of high-energy (HE) systems, wherein each of the plurality of HE systems is located in an aircraft, determining a present state of each of the plurality of HE systems based on the sensor data, determining a target state of each of the plurality of HE systems based on the present state of each of the plurality of HE systems and a set of HE system rules, and automatically generating one or more control actions to effect control of one or more of the plurality of HE systems based on the target state of each of the plurality of HE systems. Examples further include receiving a schedule of tasks to be performed on the aircraft, where determining the target state is further based on the schedule of tasks.

20 Claims, 8 Drawing Sheets

HIGH-ENERGY MANAGEMENT SYSTEM

FIELD

The disclosure relates to technology for managing high-energy (HE) systems for an aircraft. More particularly, the disclosure relates to a control system to control aircraft high-energy systems based on the present state of HE systems and HE system rules.

BACKGROUND

During manufacturing, testing, or maintenance of an aircraft, workers may be exposed to high-energy systems such as, e.g., an electrical system, a hydraulic system, a propulsion system, a flight deck power system, a fuel system, etc. These systems may be activated or deactivated unexpectedly and/or in a conflicting manner during manufacture, testing or maintenance operations, resulting in injuries to workers related to inadvertent exposure to high-energy systems, damage to equipment or devices, and/or servicing delays. Currently, the only mechanism for preventing inadvertent exposure to high-energy systems is through geo-fencing, where physical barriers or boundaries are erected around a perimeter to keep people away from particular areas of the aircraft where there is a risk of exposure to high-energy systems. However, such an approach has disadvantages, because critical employees who are required to work on the high-energy systems (e.g., within the perimeter) are still subject to a risk of exposure. Furthermore, geo-fencing does not protect equipment (e.g., within the perimeter) from damage due to exposure.

SUMMARY

Disclosed herein are methods, devices, and systems to manage high-energy systems in an aircraft (A/C) by determining a target state for the high-energy systems based on present state and a set of high-energy system rules, and generating control actions to effect control of the high-energy systems based on the target state. The target state is set to avoid incompatible systems from being activated at the same time. In some examples, the target state is further determined based on a schedule of tasks (e.g., high-energy system tasks) to be performed on the aircraft. Moreover, the states and modes of each high-energy system on the aircraft will be communicated to key personnel in real-time, providing for awareness of high-energy system status and potential conflicting system activation.

In accordance with one or more examples, a method of controlling a high-energy management system comprises receiving sensor data from a plurality of high-energy (HE) systems, wherein each of the plurality of HE systems is located in an aircraft, determining a present state of each of the plurality of HE systems based on the sensor data, determining a target state of each of the plurality of HE systems based on the present state of each of the plurality of HE systems and a set of HE system rules, and automatically generating one or more control actions to effect control of one or more of the plurality of HE systems based on the target state of each of the plurality of HE systems.

In accordance with one or more examples, a high-energy management system controller comprises a processor, and memory coupled to the processor, the memory comprising instructions which, when executed by the processor, cause the high-energy management system controller to perform operations comprising receiving sensor data from a plurality of high-energy (HE) systems, wherein each of the plurality of HE systems is located in an aircraft, determining a present state of each of the plurality of HE systems based on the sensor data, determining a target state of each of the plurality of HE systems based on the present state of each of the plurality of HE systems and a set of HE system rules, and automatically generating one or more control actions to effect control of one or more of the plurality of HE systems based on the target state of each of the plurality of HE systems.

In accordance with one or more examples, at least one computer-readable storage medium comprises instructions which, when executed by a processor, cause a high-energy management system controller to perform operations comprising receiving sensor data from a plurality of high-energy (HE) systems, wherein each of the plurality of HE systems is located in an aircraft, determining a present state of each of the plurality of HE systems based on the sensor data, determining a target state of each of the plurality of HE systems based on the present state of each of the plurality of HE systems and a set of HE system rules, and automatically generating one or more control actions to effect control of one or more of the plurality of HE systems based on the target state of each of the plurality of HE systems.

The features, functions, and advantages that have been discussed can be achieved independently in various examples or may be combined in yet other examples, further details of which can be seen with reference to the following description and drawings.

BRIEF DESCRIPTION OF THE DRAWINGS

The various advantages of the examples will become apparent to one skilled in the art by reading the following specification and appended claims, and by referencing the following drawings, in which:

Accordingly, it is to be understood that the examples herein described are merely illustrative of the application of the principles disclosed. Reference herein to details of the illustrated examples is not intended to limit the scope of the claims, which themselves recite those features regarded as essential to the disclosure.

DESCRIPTION

Disclosed are methods, apparatuses, and systems for managing high-energy systems (HEMS) in an aircraft. High-energy systems are required for safe operation of an aircraft, but exposure to high-energy systems (HE system) during manufacture, testing or maintenance can result in injuries to personnel and damage to equipment or devices. A "high-energy" system for an aircraft is one that presents a risk of bodily harm and/or equipment damage due to exposure to one or more of the following types of energy: electrical (e.g., via electric voltage, electric current, electric charge, etc.), thermal (e.g., via liquid, gas, material surface, etc.), pneumatic (e.g., via air under pressure), hydraulic (e.g., via liquid under pressure), mechanical/kinetic (e.g., via motion of an object), mechanical/potential (e.g., via stored position or gravity), ordnance (e.g., via explosive material), and/or radiation (e.g., via radio frequency, electric and magnetic field radiation, etc.).

Examples of a high-energy system include one or more of an electrical system, a hydraulics system, a propulsion system, a flight deck power system, a payload and ordinance system, and/or a fuel system. As one example, a hydraulics system can present a risk of bodily harm and/or equipment damage due not only to liquid under pressure but also to movement of an apparatus (e.g., wing flap) caused by a change in hydraulic pressure. Other examples of a high-energy system for an aircraft can include one or more of a radar system, an oxygen tank (or bottle) system, a pneumatic system, a door spring system, etc.

Thus, there is a need for appropriate control of high-energy systems to avoid exposure that can otherwise result in injuries or damage. The technology described herein meets this need by actively and continuously controlling activation and deactivation of high-energy systems to mitigate, reduce or avoid system conflicts such as inadvertent, simultaneous exposure to conflicting types of high energy that are not only dangerous, but can cause delays in scheduling as well as quality issues (e.g., due to equipment damage on the aircraft). This capability not only supports personnel during the manufacturing process but also during testing or maintenance activities.

Figure 1A:
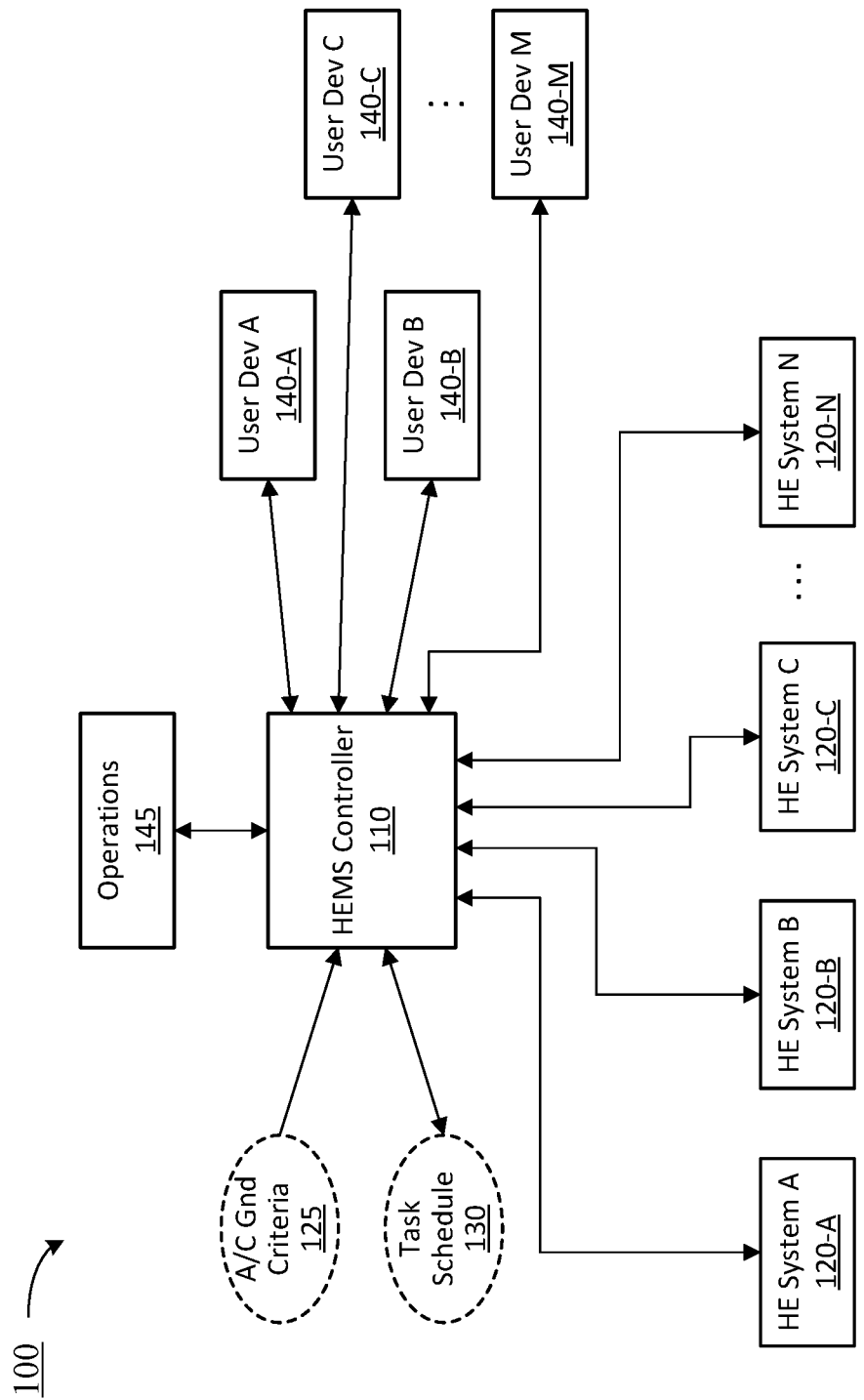
FIGS. 1A-1B provide block diagrams illustrating an example of a high-energy management system according to one or more examples.
Figure 1B:
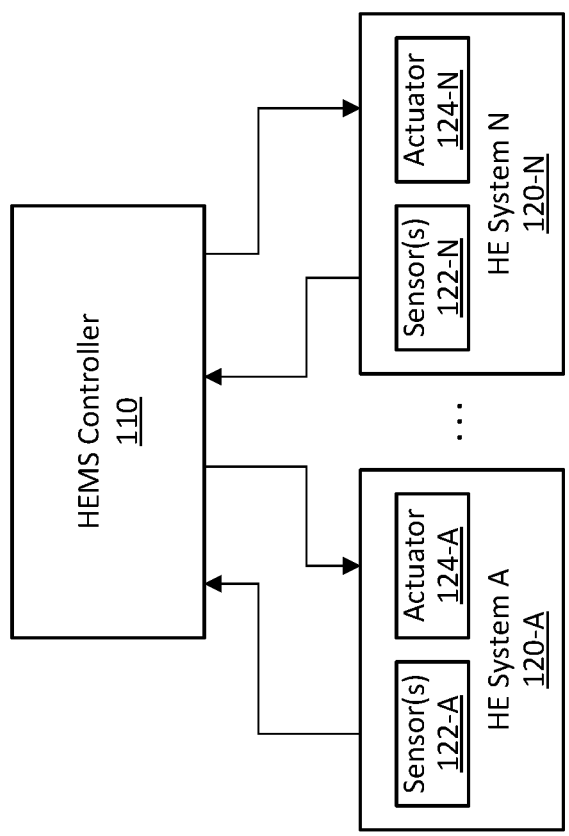

FIGS. 1A-1B provide block diagrams illustrating an example of a high-energy management system 100 according to one or more examples, with reference to components and features described herein including but not limited to the figures and associated description. As shown in FIG. 1A, the high-energy management system 100 includes a high-energy management system controller 110, a plurality of high-energy (HE) systems 120, and a plurality of user devices 140. The high-energy management system controller 110 communicates with each of the HE systems 120 and with each of the user devices 140. Communications are exchanged, typically, between the high-energy management system controller 110 and individual systems or devices (e.g., individual ones of the HE systems 120 and/or the user devices 140) via wireless and/or wired connections. In examples the high-energy management system 100 includes, or interfaces with, an operations system 145 that, via one or more operations managers and/or team leaders, provides for overall control or supervision of the aircraft, including supervision over the high-energy management system controller 110. Further details regarding the high-energy management system controller 110 are provided herein with reference to FIG. 3.

The plurality of HE systems 120 include HE system A (120-A), HE system B (120-B), HE system C (120-A), through HE system N (120-N), and can include any number of HE systems for an aircraft. For example, the plurality of HE systems 120 can include one or more of an electrical system, a hydraulics system, a propulsion system, a flight deck power system, a payload and ordinance system, and/or a fuel system. In examples, any of these HE systems can include a plurality of systems or sub-systems (e.g., to include divided, distributed and/or redundant system functionality). Other examples of HE systems for an aircraft can include one or more of a radar system, an oxygen tank (or bottle) system, a pneumatic system, a door spring system, etc. Any given HE system of the plurality of HE systems 120 is typically coupled (e.g., connected) to the high-energy management system controller 110 via a wired and/or a wireless connection, including via a network (not shown in FIG. 1A). Further details regarding the architecture of the high-energy management system 100 are provided herein with reference to FIG. 1B.

The plurality of user devices 140 include user device A (140-A), user device B (140-B), user device C (140-C), through user device M (140-M). For example, the plurality of user devices 140 can include one or more of a desktop computer, a laptop computer, a tablet computer, a smart phone, a smart watch, etc. Any given user device of the plurality of user devices 140 is typically coupled (e.g., connected) to the high-energy management system controller 110 via a wired and/or a wireless connection, including via a network (not shown in FIG. 1A).

Optionally, in combination with the examples described above (or below), in examples the high-energy management system controller 110 further receives as input A/C on ground criteria 125 (labeled as "A/C Gnd Criteria" in FIGS. 1A, 2A and 3). The A/C on ground criteria 125 provides information to enable the high-energy management system controller 110 to confirm that the aircraft is on the ground and not in flight. In such examples, the high-energy management system controller 110 will actively control the HE systems 120 only if the aircraft is confirmed to be in a ground state (i.e., on the ground). The high-energy management system controller 110 evaluates the information from the A/C on ground criteria 125 and determines whether the aircraft is on the ground. In some examples, the A/C on ground criteria are evaluated by another module (e.g., a maintenance module or a manufacturing test module, which are not shown in FIG. 1A), and the result of that evaluation (e.g., an indication that the aircraft is in a ground state or the aircraft is not in a ground state) is provided as the A/C on ground criteria 125 to the high-energy management system controller 110.

Optionally, in combination with the examples described above (or below), in examples the high-energy management system controller 110 further receives as input a task schedule 130. The task schedule 130 provides information regarding tasks (e.g., manufacturing tasks, testing tasks or maintenance tasks) for high-energy systems to be performed on the aircraft, along with the timing and/or sequence for performance of the tasks. The task schedule can be provided, e.g., via a scheduling tool. The tasks (and timing/sequence thereof) will influence, based at least on HE system rules, the control actions taken by the high-energy management system controller 110 with respect to any one or more of the HE systems 120.

Turning now to FIG. 1B, the diagram illustrates details regarding the architecture of the high-energy management system 100, particularly components of the HE systems 120 and communication pathways between the high-energy management system controller 110 and any one or more of the HE systems 120. Any given HE system of the plurality of HE systems 120 will typically have at least one sensor and at least one actuator. For example, as illustrated in FIG. 1B, the HE system A (120-A) has at least one sensor 122-A and at least one actuator 124-A; similarly, the HE system N (120-N) has at least one sensor 122-N and at least one actuator 124-N. The sensors and actuators are distributed through the aircraft, and are typically located in or within close proximity to the respective HE systems of the aircraft.

For a given HE system, sensor(s) provide information regarding the state of the HE system, and actuator(s) provide a control mechanism to activate (turn on) or deactivate (turn off) the HE system (or a part or component thereof). The state of an HE system relates to an operational condition of the HE system, including whether the HE system is on (e.g., active, energized, etc.) or off (e.g., inactive, de-energized, etc.). One of ordinary skill would know the types of sensors used with any of the HE systems, and would understand how to determine, from the sensor data for any given HE system, the present state of that HE system. Based on the sensor data, the high-energy management system controller 110 determines the present state of each of the HE systems 120. That is, the high-energy management system controller 110 is configured to interpret, for a given HE system, the sensor data for that HE system in order to determine, based on that data, the present state of that HE system. The high-energy management system controller 110 then determines a target state for each of the HE systems 120 based on the present state and on HE system rules, and generates control actions to effect control of the HE systems 120.

In some cases, a given HE system will have a plurality of sensors and/or a plurality of actuators. As one example, for a HE system relating to a hydraulics system for setting and adjusting wing flaps, the hydraulics system includes a plurality of sensors relating to wing flaps (e.g., each wing having a wing flap, and each wing flap having a sensor, etc.). Likewise, the hydraulics system includes a plurality of actuators relating to wing flaps (e.g., each wing having a wing flap, and each wing flap having an actuator, etc.). As another example, a given HE system can have multiple sensors for purposes of redundancy (e.g., redundant sensors to protect the HE system and the aircraft in the event of a sensor failure).

As illustrated in FIG. 1B, there is typically one or more communication pathways (e.g., a wired and/or wireless connections) between the high-energy management system controller 110 and each given HE system. For example, there can be one communication pathway for data from the sensor(s) for a given HE system, and another communication pathway for commands to the actuator(s) for that HE system. Typically, each HE system has a subcontroller (not shown in FIG. 1B) through which data and/or commands flow between the high-energy management system controller 110 and the sensor(s) and actuator(s) for that HE system. As one example, for a hydraulics system, the example HE system includes a hydraulics subcontroller that obtains sensor data (e.g., data from a pressure transducer that measures hydraulic pressure) and provides the sensor data to the high-energy management system controller 110.

In the example architecture details shown in FIG. 1B, there is a first communication pathway between the high-energy management system controller 110 and the HE system A (120-A) for data from the sensor(s) 122-A, a second communication pathway between the high-energy management system controller 110 and the HE system A (120-A) for commands to the actuator 124-A, a third communication pathway between the high-energy management system controller 110 and the HE system N (120-N) for data from the sensor(s) 122-N, and a fourth communication pathway between the high-energy management system controller 110 and the HE system N (120-N) for commands to the actuator 124-N. These communication pathways can be separate or shared or partially overlapping. Thus, in some examples the communication pathways between the high-energy management system controller 110 and a given HE system are shared and/or overlapping.

In some examples, the high-energy management system controller 110 of the high-energy management system 100 is installed/embedded within an aircraft, and can be located almost anywhere in the aircraft. Alternatively, in other examples, the high-energy management system controller 110 is situated externally to the aircraft (e.g., as part of a mobile physical unit used, for example, while the aircraft is being manufactured or under testing) and communicates with the HE systems via wired and/or wireless connections. For instance, in some of the other examples, the high-energy management system controller 110 is integrated with a testing or maintenance module (not shown). The high-energy management system controller 110 is adapted to interact with any individual HE system (e.g., as described above via separate communication pathways or via shared or overlapping pathways). As one example, the high-energy management system controller 110 is adapted to issue a command for an actuator of a given HE system to activate or deactivate the HE system (or a portion thereof), and then receive sensor data (e.g., data providing the status for the given HE system) from which the high-energy management system controller 110 confirms that the command was successfully carried out.

Some or all components in the high-energy management system 100 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the high-energy management system 100 can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations by the high-energy management system 100 can be written in any combination of one or more programming languages, including an object oriented programming language such as Java, JavaScript, Python, C #, C++, Perl, Smalltalk, or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2A:
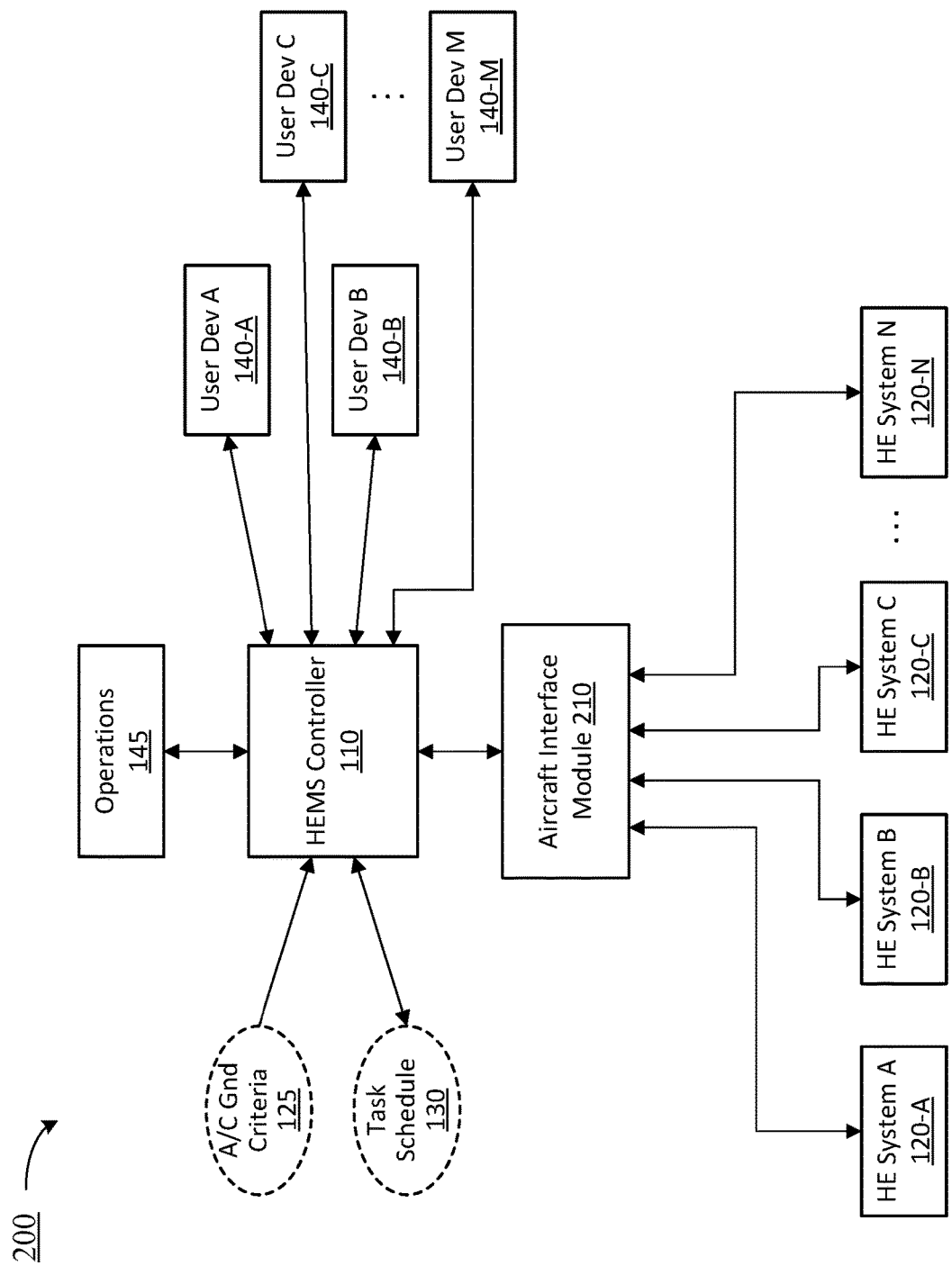
FIGS. 2A-2B provide block diagrams illustrating another example of a high-energy management system according to one or more examples.
Figure 2B:
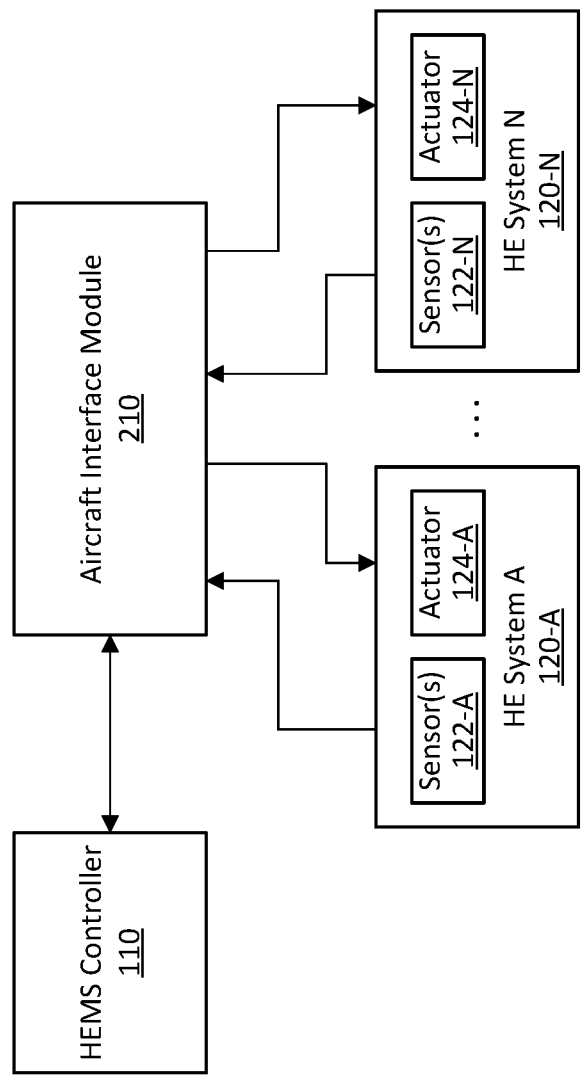

FIGS. 2A-2B provide block diagrams illustrating another example of a high-energy management system 200 according to one or more examples, with reference to components and features described herein including but not limited to the figures and associated description. The high-energy management system 200 includes components and features the same as or similar to those in the high-energy management system 100 (FIGS. 1A-1B, already discussed), and those components and features will not be repeated except as appropriate to describe the components and features of the high-energy management system 200. As shown in the example of FIG. 2A, the high-energy management system 200 includes, in addition to components of the high-energy management system 100 (FIGS. 1A-1B), an aircraft interface module 210. The aircraft interface module 210 is situated, from a logical viewpoint, between the high-energy management system controller 110 and the plurality of the HE systems 120. The aircraft interface module 210 provides a communications interface between the high-energy management system controller 110 and the plurality of the HE systems 120, such that requests, commands, data, etc. flowing between the high-energy management system controller 110 and the plurality of the HE systems 120 are routed through the aircraft interface module 210.

In effect, the aircraft interface module 210 is a passthrough device with respect to commands and data flowing between the high-energy management system controller 110 and the plurality of the HE systems 120; the aircraft interface module 210 does not itself provide the HE system control functionality as described herein. Further details regarding the architecture of the high-energy management system 200 are provided herein with reference to FIG. 2B.

In some examples, the aircraft interface module 210 is a module provided as part of a manufacturing or maintenance system used in manufacturing, testing or maintenance of aircraft HE systems. In some examples, a hybrid architecture is used where communications between the high-energy management system controller 110 and some of the plurality of HE systems 120 are routed through the aircraft interface module 210, while communications between the high-energy management system controller 110 and other of the plurality of HE systems 120 are performed via pathways such as the communication pathways as illustrated in FIGS. 1A-1B and are not routed through the aircraft interface module 210. In some examples, the A/C on ground criteria 125 and/or the task schedule 130 are routed to the high-energy management system controller 110 through the aircraft interface module 210.

Turning now to FIG. 2B, the diagram illustrates details regarding the architecture of the high-energy management system 200, particularly components of the HE systems 120 and communication pathways between the high-energy management system controller 110 and any one or more of the HE systems 120 via the aircraft interface module 210. Similar to the architecture details illustrated in FIG. 1B, as shown in FIG. 2B there is typically one or more communication pathways (e.g., wired and/or wireless connections) between the aircraft interface module 210 and each given HE system. For example, there can be one communication pathway for data from the sensor(s) for a given HE system and another communication pathway for commands to the actuator(s) for that HE system. These communication pathways can be separate or shared or partially overlapping. A communication path (wired and/or wireless connection) exists between the high-energy management system controller 110 and the aircraft interface module 210, enabling communications (e.g., requests, commands, data) between the high-energy management system controller 110 and the HE systems to be routed via the aircraft interface module 210 (e.g., acting as a passthrough device).

In some examples, the high-energy management system controller 110 of the high-energy management system 200 is installed/embedded within an aircraft, and can be located almost anywhere in the aircraft. Alternatively, in other examples, the high-energy management system controller 110 is situated externally to the aircraft (e.g., as part of a mobile physical unit used, for example, while the aircraft is being manufactured or under testing) and communicates with the aircraft interface module 210 via a wired and/or wireless connection. For instance, in some of the other examples, the high-energy management system controller 110 is integrated with the aircraft interface module 210 or with a testing or maintenance module (not shown). Via the communication pathway between the high-energy management system controller 110 and the aircraft interface module 210 along with the communication pathways between the aircraft interface module 210 and the HE systems, the high-energy management system controller 110 is adapted to interact with any individual HE system. As one example, the high-energy management system controller 110 is adapted to issue a command for an actuator of a given HE system to activate or deactivate the HE system, and then receive sensor data (e.g., data providing the status for the given HE system) from which the high-energy management system controller 110 confirms that the command was successfully carried out.

Some or all components in the high-energy management system 200 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the high-energy management system 200 can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations by the high-energy management system 200 can be written in any combination of one or more programming languages, including an object oriented programming language such as Java, JavaScript, Python, C #, C++, Perl, Smalltalk, or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/ or other structural components that are native to hardware (e.g., host processor, central processing unit/CPU, microcontroller, etc.).

Figure 3:
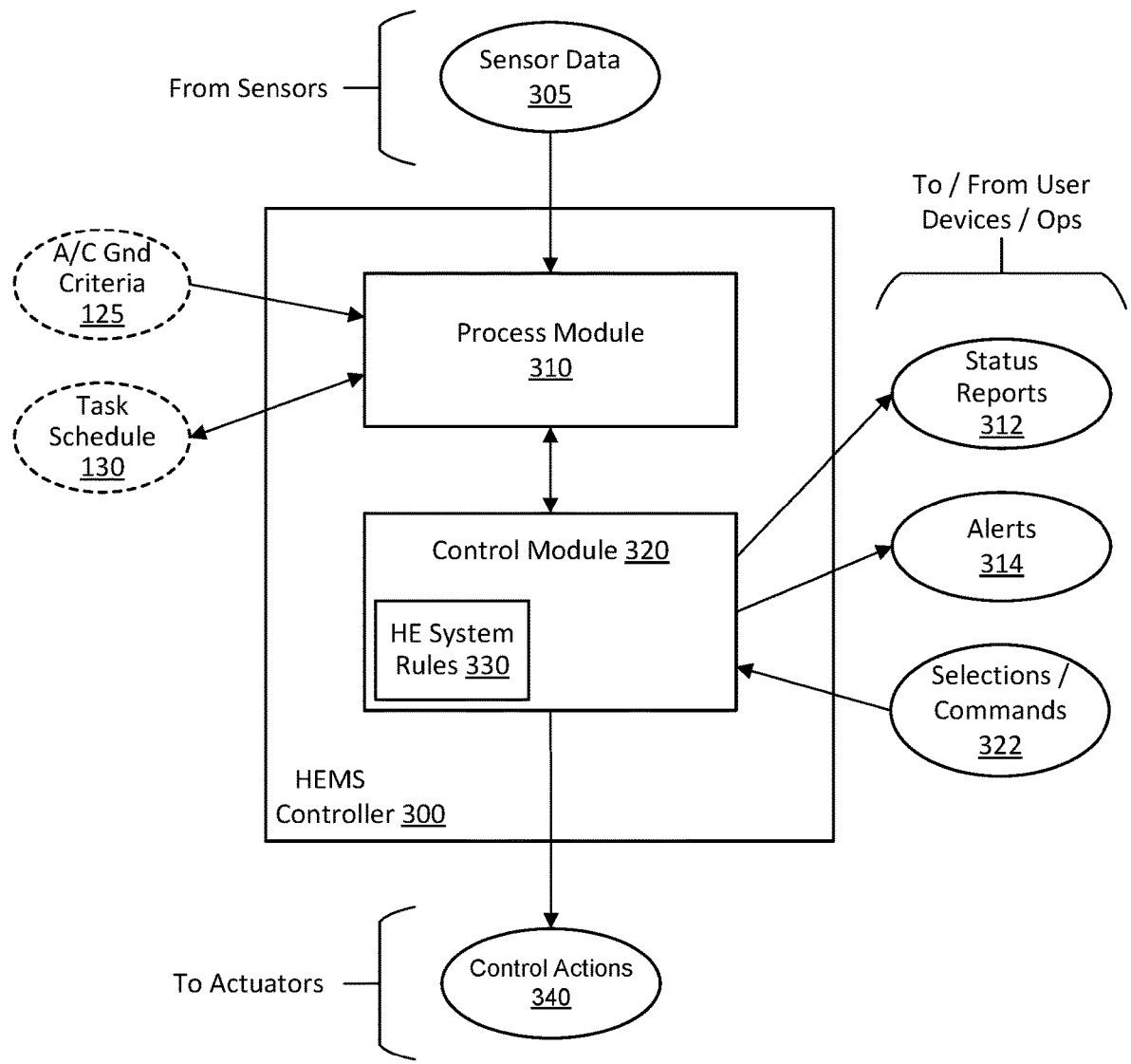
FIG. 3 provides a block diagram illustrating an example of a high-energy management system controller according to one or more examples.

FIG. 3 provides a block diagram illustrating an example of a high-energy management system controller 300 according to one or more examples, with reference to components and features described herein including but not limited to the figures and associated description. The high-energy management system controller 300 corresponds to the high-energy management system controller 110 (FIGS. 1A-1B and 2A-2B, already discussed). As shown in FIG. 3, the high-energy management system controller 300 includes a process module 310 and a control module 320 which includes HE system rules 330. The high-energy management system controller 300 receives sensor data 305 obtained from sensors of the HE systems—e.g., via communication pathways between the high-energy management system controller 300 and the HE systems 120 (e.g., as described herein with reference to FIGS. 1A-1B) or via the aircraft interface module 210 (e.g., as described herein with reference to FIGS. 2A-2B). In examples, the high-energy management system controller 300 also receives as input A/C on ground criteria 125 and/or a task schedule 130.

The high-energy management system controller 300 issues (e.g., sends) status reports 312 and alerts 314 to user devices (e.g., user devices 140, FIGS. 1A and 2A) and, when present, to an operations system (e.g., the operations system 145 in FIGS. 1A and 2A, labeled as "Ops" in FIG. 3). The high-energy management system controller 300 and receives one or more selection(s)/command(s) 322 from authorized users via the user devices and/or, when present, the operations system. The high-energy management system controller 300 also issues control actions 340 for actuators of the HE systems 120—e.g., via communication pathways between the high-energy management system controller 300 and the HE systems 120 (e.g., as described herein with reference to FIGS. 1A-1B) or via the aircraft interface module 210 (e.g., as described herein with reference to FIGS. 2A-2B).

The process module 310 receives and analyzes, in real time, the sensor data 305 collected from the sensors of the HE systems 120. The sensor data includes feedback data regarding a status (including, e.g., a state, mode and/or condition) relating to each particular HE system. One of ordinary skill would know the types of sensors used with any of the HE systems, and would understand how to determine, from the sensor data for any given HE system, the present state of that HE system. The process module 310 is configured to interpret, for a given HE system, the sensor data for that HE system in order to determine, based on that data, the present state of that HE system. Based on the sensor data, the process module 310 determines the present (e.g., current) state of each of the HE systems 120. For example, a present state can include an on state (e.g., the particular HE system is on, energized, active/activated, etc.) or an off state (e.g., the particular HE system is off, locked off/out, de-energized, inactive/deactivated, etc.). The process module 310 then sends, in real time, information relating to the present state of the HE systems to the control module 320.

In examples, the process module 310 receives and analyzes, in real time, the task schedule 130. The task schedule 130 provides information regarding tasks (including, e.g., manufacturing tasks, testing tasks or maintenance tasks, along with details about the task) for high-energy systems to be performed on the aircraft, along with the timing and/or sequence for performance of the tasks. The process module 310 determines a present (e.g., current) state of scheduled tasks for the aircraft-including, e.g., any delays in starting or completing particular tasks, and sends information relating to the present state of scheduled tasks for the aircraft to the control module 320. The process module 310 also sends updates regarding tasks (e.g., based on control actions as determined by the control module 320 or overrides issued by an authorized user), which can include changes to the schedule.

In examples, the process module 310 receives and evaluates A/C on ground criteria 125. The A/C on ground criteria 125 provides information to confirm that the aircraft is on the ground and not in flight. In some examples, the A/C on ground criteria 125 includes information for one or more conditions including conditions such as weight on wheels, gears pinned, engines off, etc. that indicate the aircraft is on the ground and not in flight. In some examples, these conditions are evaluated by another module (e.g., a maintenance module, not shown) and the result of that evaluation is an indication (e.g., the aircraft is in a ground state or the aircraft is not in a ground state) that is provided as the A/C on ground criteria 125 to the process module 310.

The process module 310 evaluates the A/C on ground criteria 125 and determines whether the aircraft is in a ground state (i.e., is on the ground). If the process module 310 determines from the A/C on ground criteria 125 that the aircraft is in a ground state (i.e., on the ground), the high-energy management system controller 300 will (via the control module 320) actively control the HE systems 120 via the control actions 340; otherwise, if the aircraft is not determined to be in a ground state, the high-energy management system controller 300 will not issue control actions 340 to control the HE systems 120. In this way, active control of the HE systems by the control module 320 is conditioned on a determination that the aircraft is in a ground state.

The control module 320 receives, in real time, information relating to the present state of the HE systems from the process module 310. In examples, the control module 320 also receives, in real time, information relating to the present state of scheduled tasks for the aircraft from the process module 310. The control module 320 evaluates, using HE system rules 330, the information received from the process module 310 (i.e., including the present state of the HE systems and, when provided, the present state of scheduled tasks) and determines a target state for each of the plurality of HE systems 120. The target state for an HE system is a state permitted by the HE system rules 330 to prevent or remove conflicts between activation and/or deactivation of individual HE systems.

Based on the target state for each of the HE systems 120, the control module 320 automatically generates one or more control action(s) 340 to effect control of one or more of the plurality of HE systems 120. For example, the control module 320 generates a control action 340 to be sent to a particular HE system actuator when necessary to place the HE system into the target state—e.g., when the present state of that HE system does not match the target state for that HE system. A control action 340 includes one or more commands issued to one or more actuators for a given HE system to place the HE system into the target state as determined by the control module 320. For example, the commands can include a command to turn the particular HE system on or off. In some examples, the commands are issued in sequence to effectuate control of HE system activation or deactivation according to a sequence (e.g., a control sequence as established by the HE system rules 330 for a given task). In examples, when the present state of that HE system matches the target state for that HE system, no control action is needed and thus is not generated for that HE system at that time.

Thus, by actively generating, in real time, control actions 340, the control module 320 ensures that each respective HE system of the plurality of HE systems 120 is placed into (or remains in) the target state for that HE system until necessary or appropriate to change the target state for that HE system based on the then present state of HE systems, change in present state of tasks, etc. As one example, if the control module 320 determines that the hydraulic system is presently active and that a current task involves work in the vicinity of wing flaps on the aircraft, based on the HE system rules the control module 320 issues control actions to one or more actuators for the hydraulic system as necessary to keep the hydraulic system active for the duration of the task (e.g., preventing deactivation of the hydraulic system) to prevent the flaps from dropping and potentially causing injury. Further, based on the HE system rules 330 the control module 320 issues control actions to deactivate, or keep in a deactivated state, any HE systems that would conflict with the hydraulic system being in an active state for the particular task (e.g., preventing activation of any conflicting HE systems during the task).

The HE system rules 330 can, for example, be stored in a memory included in or accessible to the high-energy management system controller 300. The HE system rules 330 define which HE systems can be activated (e.g., on) or deactivated (e.g., off) at the same time. In some examples, the HE system rules 330 include one or more of (a) rules specifying which of the plurality of HE systems can be active with each other (such as, e.g. a rule specifying that HE system A can be active when HE system B is active), (b) rules specifying which of the plurality of HE systems must be active with another of the plurality of HE systems (such as, e.g. a rule specifying that HE system C must be active when HE system D is active), and/or (c) rules specifying which of the plurality of HE systems cannot be active with each other (such as, e.g. a rule specifying that HE system E must be inactive when HE system F is active).

In some examples, the HE system rules 330 also specify conditions for activating or deactivating ones of the HE systems to avoid dangerous conditions. For instance, in examples, the rules specifying conditions for activating or deactivating ones of the HE systems include one or more of rules specifying a sequence for activating or deactivating a subset of the plurality of HE systems (e.g., various ones of the HE systems), and/or rules specifying timing requirements related to activating or deactivating ones of the HE systems. In examples, the rules are defined based at least in part on the type or nature of task (e.g., manufacturing tasks, testing tasks or maintenance tasks). As one example, for a testing or maintenance task for an electrical system, the HE system rules 330 can specify that two adjacent electrical systems (i.e., two systems, or components thereof, in close proximity to each other) not be activated at the same time, to avoid inadvertent or accidental contact with a nearby system.

For example, the timing/sequences defined by the HE system rules 330 ensure that a particular HE system is not turned on or off too early or too late. In some examples, the HE system rules 330 include rules that depend on the task that is being performed (or to be performed next). As one example, if a maintenance task is being performed that involves activation of the hydraulics system, the HE system rules 330 can specify that the electrical system (e.g., a complementary system to the hydraulics system) providing power to the hydraulics system is not deactivated before completion of the hydraulics task, so that power remains for the hydraulics system to have the pressure to keep the aircraft components in place for the duration of the task.

The control module 320 sends information identifying conflicts or potential conflicts among HE systems (e.g., conflicting or potentially conflicting activation and/or deactivation of HE systems) to the process module 310. Such conflicts can be caused by task scheduling, including delays in starting or completing a particular task, or inadvertent human error, or a system failure, etc.

The control module 320 also communicates with the user devices 140. The control module 320 sends status reports 312 to one or more of the user devices 140 for display. The user devices 140 can be devices allocated to and/or operated by personnel involved in manufacture, testing or maintenance of various aircraft systems, components, etc. In some examples, status reports 312 are sent to all personnel involved in manufacture, testing or maintenance, or key personnel (e.g., having primary or supervisory responsibilities), while in other examples the status reports 312 are sent to personnel on a project or task basis (e.g., personnel involved in particular projects or tasks involving interaction or potential exposure to particular HE systems). The status reports 312 provide information as to the present state of one or more of the HE systems 120. For example, the status reports 312 indicate which HE systems are in an on state, and which HE systems are in an off state. In examples, the status reports also provide information regarding the present state of scheduled tasks, including, e.g., any delays in starting or completing particular tasks.

The real-time status information in the status reports 312 can be displayed to any digital client device, such as, for example (but not limited to) smart watches, smart phones, tablets, laptops, desktop computers, etc. Additionally, in some examples the real-time status information in the status reports 312 are provided via a database where users can login to view or retrieve the status information. With that information, all key personnel will know in real-time which systems are on/active and which are off/deactivated/locked out.

In addition, the control module 320 sends alerts 314 to one or more of the user devices 140. In some examples, the alerts 314 are sent to all personnel involved in manufacture, testing or maintenance, while in other examples the alerts 314 are sent to key personnel (e.g., having primary or supervisory responsibilities), or to personnel on a project or task basis (e.g., personnel involved in particular projects or tasks involving interaction or potential exposure to particular HE systems). The alerts 314 provide information of a higher priority or urgency than the status reports 312, such as, e.g., information regarding the target state of one or more of the plurality of HE systems, or one or more control actions, changes in task scheduling, or conflicting activation and/or deactivation of HE systems (e.g., potentially relating to task scheduling or delays). Such conflicts can include potential conflicts (e.g., a conflict that has not yet occurred) and can be caused by task scheduling, including delays in starting or completing a particular task, or inadvertent human error, or a system failure, etc.

As one example, key personnel will be alerted via sending an alert 314 when two conflicting HE systems are about to be activated simultaneously; in such a case the control module 320 will issue one or more control actions 340 to deactivate (or prevent activation) of at least one or more of the conflicting HE systems in accordance with the HE system rules 330. Information identifying conflicts (including potential conflicts) is provided by the control module 320 to the process module 310. As another example, an alert 314 will be issued (e.g., sent) when one HE system task is delayed and now conflicts with another HE system task. In examples, the alerts also provide information regarding missing sensor data (e.g., data expected but not received from any particular sensor).

The control module 320 receives one or more selection(s)/command(s) 322 from one or more user devices. While status reports 312 and alerts 314 can be sent to any personnel (e.g., based on proximity to one of the HE systems), issuance of one or more selection(s)/command(s) 322 is typically limited to only certain authorized personnel, such as operations managers or team leaders, having supervisory responsibility. The selection(s)/command(s) 322 can be issued by an authorized user via a user device in response to a status report 312 and/or an alert 314. For example, an authorized user can issue a command 322 to cancel or reschedule a task, which results in the control module applying the HE system rules 330 to issue control actions 340 to effectuate the scheduling change. As another example, an authorized user can issue a command 322 to override a decision by the control module to activate or deactivate a particular HE system, e.g., an emergency stop command to deactivate the HE system.

In examples, authorized personnel can issue commands to activate or deactivate any HE system on the aircraft. In examples, the selection(s)/command(s) 322 are issued by an authorized user via an operations system (e.g., the operations system 145 in FIGS. 1A and 2A). For example, based on the receipt of a command 322, the control module 320 issues new or modified control actions 340 to one or more of the HE systems 120. In this way, the control module 320 modifies one of the one or more control actions 340 based on the command 322.

The process module 310 and the control module 320 operate in concert and on a continuous basis. This enables the high-energy management system controller 300 to actively monitor, via the process module 310, all HE systems on the aircraft and, via the control module 320, to provide ongoing real-time status reports and alerts and to actively provide real-time controls to deconflict HE system activations.

Some or all components in the high-energy management system controller 300 can be implemented using one or more of a CPU, a GPU, an AI accelerator, an FPGA accelerator, an ASIC, and/or via a processor with software, or in a combination of a processor with software and an FPGA or ASIC. More particularly, components of the high-energy management system controller 300 can be implemented in one or more modules as a set of program or logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations by the high-energy management system controller 300 can be written in any combination of one or more programming languages, including an object oriented programming language such as Java, JavaScript, Python, C #, C++, Perl, Smalltalk, or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4A:
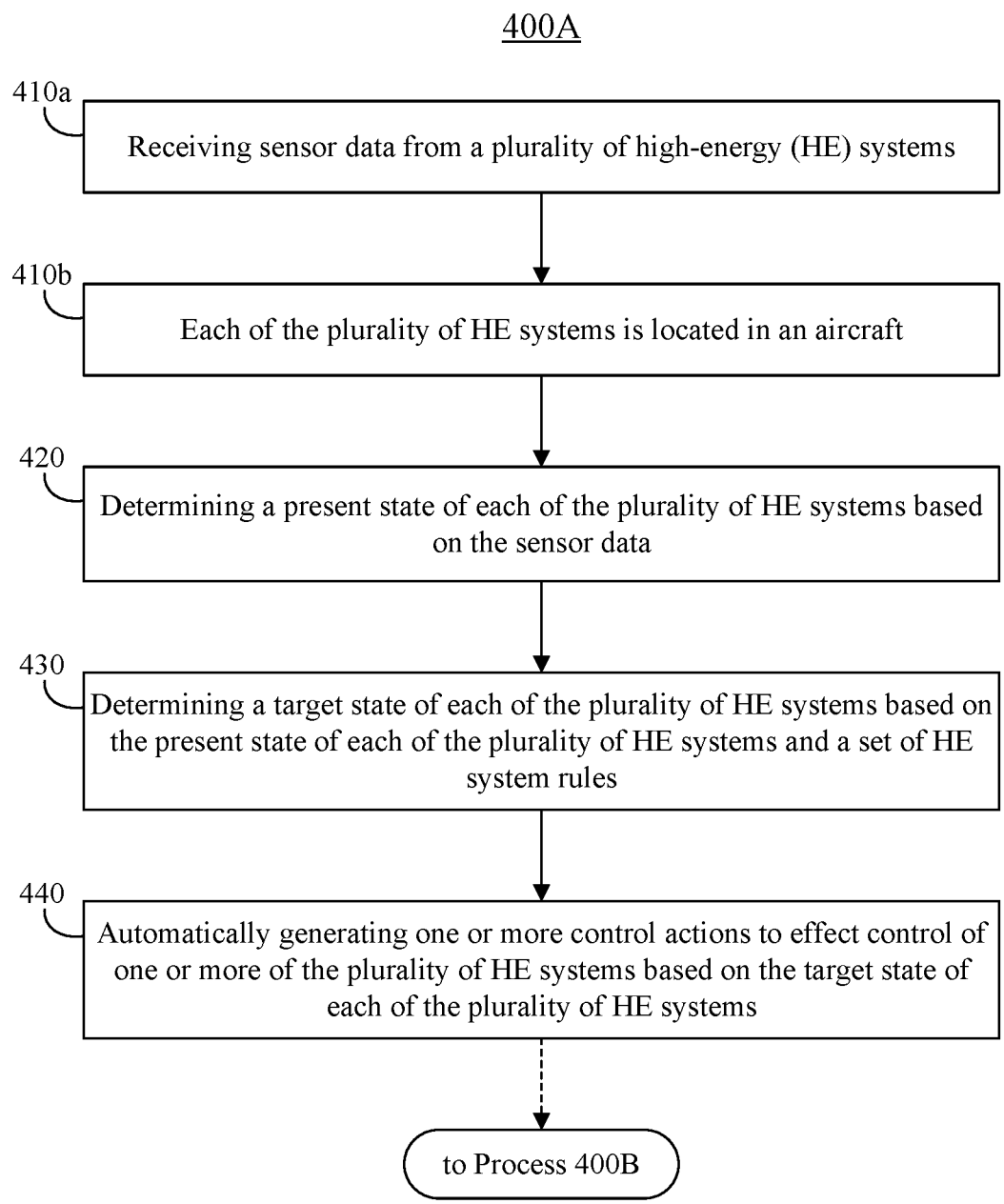
FIGS. 4A-4B provide flow diagrams illustrating an example method of controlling a high-energy management system according to one or more examples.
Figure 4B:
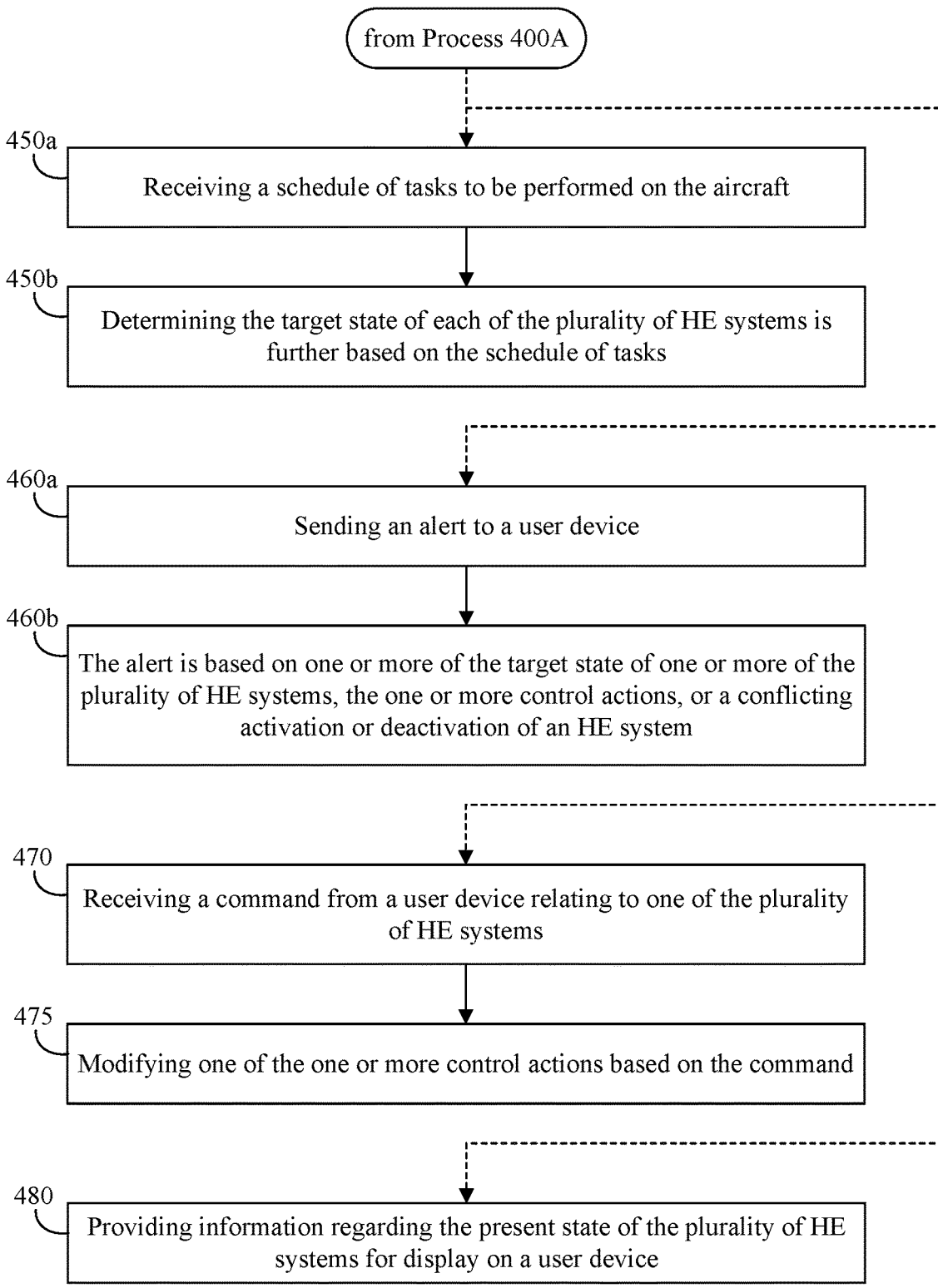

FIGS. 4A-B provide flow diagrams illustrating an example method 400 (including process components 400A and 400B) of controlling a high-energy management system according to one or more examples, with reference to components and features described herein including but not limited to the figures and associated description. The method 400 can generally be implemented in the high-energy management system 100 (FIGS. 1A-1B, already discussed), the high-energy management system 200 (FIGS. 2A-2B, already discussed), and/or via the high-energy management system controller 300 (FIG. 3, already discussed), or components thereof. More particularly, the method 400 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 400 and/or functions associated therewith can be written in any combination of one or more programming languages, including an object oriented programming language such as Java, JavaScript, Python, C #, C++, Perl, Smalltalk, or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to FIG. 4A, illustrated processing block 410a provides for receiving sensor data from a plurality of high-energy (HE) systems, where at block 410b each of the plurality of HE systems is located in an aircraft. Illustrated processing block 420 provides for determining a present state of each of the plurality of HE systems based on the sensor data. Illustrated processing block 430 provides for determining a target state of each of the plurality of HE systems based on the present state of each of the plurality of HE systems and a set of HE system rules. Illustrated processing block 440 provides for automatically generating one or more control actions to effect control of one or more of the plurality of HE systems based on the target state of each of the plurality of HE systems.

In some examples, the set of HE system rules includes rules specifying conditions for activating or deactivating ones of the plurality of HE systems, and one or more of: rules specifying which of the plurality of HE systems can be active with each other, rules specifying which HE systems must be active with another of the plurality of HE systems, or rules specifying which HE systems cannot be active with each other. In some examples, the rules specifying conditions for activating or deactivating the ones of the plurality of HE systems include one or more of rules specifying a sequence for activating or deactivating a subset of the plurality of HE systems, or rules specifying timing requirements related to activating or deactivating the ones of the plurality of HE systems. In some examples, active control of the plurality of HE systems is conditioned on a determination that the aircraft is in a ground state. In some examples, the plurality of HE systems include one or more HE systems selected from a group including an electrical system, a hydraulic system, a propulsion system, a flight deck power system, a payload and ordinance system, or a fuel system.

Turning now to FIG. 4B, in some examples illustrated processing block 450a provides for receiving a schedule of tasks to be performed on the aircraft (e.g., tasks for high-energy systems), where at block 450b determining the target state of each of the plurality of HE systems is further based on the schedule of tasks. In some examples, the rules specifying conditions for activating or deactivating the ones of the plurality of HE systems are based on one or more identified tasks. In some examples, illustrated processing block 460a provides for sending an alert to a user device, where at block 460b the alert is based on one or more of the target state of one or more of the plurality of HE systems, the one or more control actions, or a conflicting activation or deactivation of an HE system.

In some examples, illustrated processing block 470 provides for receiving a command from a user device relating to one of the plurality of HE systems, and illustrated processing block 475 provides for modifying one of the one or more control actions based on the command. In examples, the command is received from a user device of a user authorized to issue commands. In some examples, illustrated processing block 480 includes providing information regarding the present state of the plurality of HE systems for display on a user device.

Figure 5:
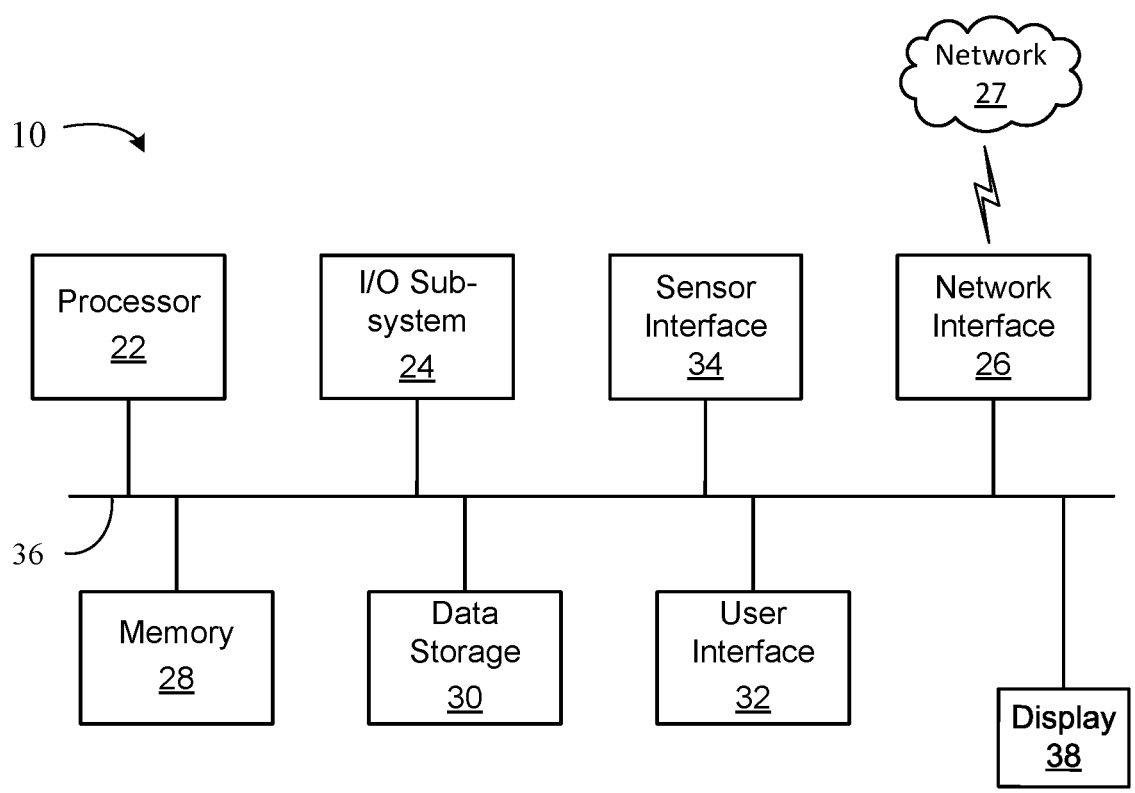
FIG. 5 provides a block diagram illustrating an example computing system for use in controlling a high-energy management system according to one or more examples.

FIG. 5 provides a block diagram illustrating an example of a computing system 10 for use in controlling a high-energy management system according to one or more examples, with reference to components and features described herein including but not limited to the figures and associated description. In examples the computing system 10 corresponds to or implements all or portions of the high-energy management system 100 (FIGS. 1A-1B, already discussed), the high-energy management system controller 110 (FIGS. 1A-1B, already discussed), all or portions of the high-energy management system 200 (FIGS. 2A-2B, already discussed), and/or the high-energy management system controller 300 (FIG. 3, already discussed). Although FIG. 5 illustrates certain components, the computing system 10 can include additional or multiple components connected in various ways. It is understood that not all examples will necessarily include every component shown in FIG. 5. The computing system 10 includes one or more processor(s) 22. In some examples the computing system 10 also includes an input/output (I/O) subsystem 24, a network interface 26, a memory 28, a data storage 30, a user interface 32, and/or a sensor interface 34. The computing system 10 can also include a display 38. These components are coupled, connected or otherwise in data communication via an interconnect 36. In some examples, the computing system 10 can interface with a separate display such as, e.g., a display installed as original equipment in the aircraft.

The processor 22 includes one or more processing devices such as a microprocessor, a fixed application-specific integrated circuit (ASIC) processor, a reduced instruction set computing (RISC) processor, a complex instruction set computing (CISC) processor, a field-programmable gate array (FPGA), a digital signal processor (DSP), etc., along with associated circuitry, logic, and/or interfaces. The processor 22 can include, or be connected to, a memory (such as, e.g., the memory 28) storing executable instructions and/or data, as necessary or appropriate. The processor 22 executes such instructions to implement, control, operate or interface with any devices or features of the high-energy management system 100, the high-energy management system controller 110, the high-energy management system 200, and/or the high-energy management system controller 300, and/or any of the devices, features or methods described herein with reference to FIGS. 1A-1B, 2A-2B, 3 and/or 4A-4B. The processor 22 can communicate, send, or receive messages, requests, notifications, data, etc. to/from other devices, such as the devices illustrated in FIGS. 1A-1B, 2A-2B, and/or 3. The processor 22 can be embodied as any type of processor capable of performing the functions described herein. For example, the processor 22 can be embodied as a single or multi-core processor(s), a digital signal processor, a microcontroller, or other processor or processing/controlling circuit. The processor 22 can include embedded instructions (e.g., processor code).

The I/O subsystem 24 includes circuitry and/or components suitable to facilitate input/output operations with the processor 22, the memory 28, and other components of the computing system 10.

The network interface 26 includes suitable logic, circuitry, and/or interfaces that transmits and receives data over one or more communication networks using one or more communication network protocols. The network interface 26 can operate under the control of the processor 22, and can transmit/receive various requests and messages to/from one or more other devices (such as, e.g., any one or more of the devices illustrated in FIGS. 1A-1B, 2A-2B, and/or 3). The network interface 26 can include wired and/or wireless data communication capability; these capabilities can support data communication with a wired and/or wireless communication network, such as the network 27, and further including the Internet, a wide area network (WAN), a local area network (LAN), a wireless personal area network, a wide body area network, a cellular network, a telephone network, any other wired and/or wireless network for transmitting and receiving a data signal, or any combination thereof (including, e.g., a Wi-Fi network or corporate LAN). The network interface 26 can support communication via a short-range wireless communication field, such as Bluetooth, near-field communication (NFC), or radio frequency identification (RFID). Examples of network interface 26 can include, but are not limited to, an antenna, a radio frequency transceiver, a wireless transceiver, a Bluetooth transceiver, an ethernet port, a universal serial bus (USB) port, or any other device configured to transmit and receive data.

The memory 28 includes suitable logic, circuitry, and/or interfaces to store executable instructions and/or data, as necessary or appropriate, when executed, to implement, control, operate or interface with any devices or features of the high-energy management system 100, the high-energy management system controller 110, the high-energy management system 200, and/or the high-energy management system controller 300, and/or any of the devices, features or methods described herein with reference to FIGS. 1A-1B, 2A-2B, 3 and/or 4A-4B. The memory 28 can be embodied as any type of volatile or non-volatile memory or data storage capable of performing the functions described herein, and can include a random-access memory (RAM), a read-only memory (ROM), write-once read-multiple memory (e.g., EEPROM), a removable storage drive, a hard disk drive (HDD), a flash memory, a solid-state memory, and the like, and including any combination thereof. In operation, the memory 28 can store various data and software used during operation of the computing system 10 such as operating systems, applications, programs, libraries, and drivers. The memory 28 can be communicatively coupled to the processor 22 directly or via the I/O subsystem 24.

The data storage 30 can include any type of device or devices configured for short-term or long-term storage of data such as, for example, memory devices and circuits, memory cards, hard disk drives, solid-state drives, non-volatile flash memory, or other data storage devices. The data storage 30 can include or be configured as a database, such as a relational or non-relational database, or a combination of more than one database. In some examples, a database or other data storage can be physically separate and/or remote from the computing system 10, and/or can be located in another computing device, a database server, on a cloud-based platform, or in any storage device that is in data communication with the computing system 10.

The user interface 32 includes code to present, on a display, information or screens for a user (e.g., a user using a user device) and to receive input (including commands) from a user via an input device (e.g., a touch-screen device). The user interface 32 can include a graphical user interface (GUI).

The sensor interface 34 includes circuitry and/or components suitable to facilitate communications and/or exchange of data, commands or signals between the computing system 10 and one or more sensors, which can include one or more of the sensors 122 and/or one or more of the actuators 124 (FIGS. 1B and 2B, already discussed). The sensor interface 34 can act in concert with the network interface 26 in establishing communications with the one or more sensors.

The interconnect 36 includes any one or more separate physical buses, point to point connections, or both connected by appropriate bridges, adapters, or controllers. The interconnect 36 can include, for example, a system bus, a Peripheral Component Interconnect (PCI) bus, a Hyper-Transport or industry standard architecture bus, a small computer system interface (SCSI) bus, a universal serial bus (USB), inter-integrated circuit (I2C) bus, or an Institute of Electrical and Electronics Engineers (IEEE) standard 694 bus (e.g., "Firewire"), or any other interconnect suitable for coupling or connecting the components of the computing system 10.

The display 38 can be any type of device for presenting visual information, such as a computer monitor, a flat panel display, or a mobile device screen, and can include a liquid crystal display (LCD), a light-emitting diode (LED) display, a plasma panel, or a cathode ray tube display, etc. The display 38 can include a display interface for communicating with the display. In some examples, display 38 can include a display interface for communicating with a display external to the computing system 10 (such as, e.g., a user device).

In some examples, one or more of the illustrative components of the computing system 10 can be incorporated (in whole or in part) within, or otherwise form a portion of, another component. For example, the memory 28, or portions thereof, can be incorporated within the processor 22. As another example, the user interface 32 can be incorporated within the processor 22 and/or code in the memory 28. In some examples, the computing system 10 can be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device. In some examples, the computing system 10, or portions thereof, is implemented in one or more modules as a set of logic instructions stored in at least one non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Examples of each of the above systems, devices, components, features and/or methods, including the high-energy management system 100, the high-energy management system controller 110, the high-energy management system 200, the aircraft interface module 210, the high-energy management system controller 300, the method 400, and/or any other system components, can be implemented in hardware, software, or any suitable combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Alternatively, or additionally, all or portions of the foregoing systems, devices, components, features and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as Java, JavaScript, Python, C #, C++, Perl, Smalltalk, or the like and conventional procedural programming languages, such as the "C" programming language or similar programming languages.

Additional Notes and Examples:

Further, the disclosure comprises additional examples as detailed in the following clauses.

Clause M1. A method of controlling a high-energy management system, comprising:
receiving sensor data from a plurality of high-energy (HE) systems, wherein each of the plurality of HE systems is located in an aircraft;

determining a present state of each of the plurality of HE systems based on the sensor data;

determining a target state of each of the plurality of HE systems based on the present state of each of the plurality of HE systems and a set of HE system rules; and automatically generating one or more control actions to effect control of one or more of the plurality of HE systems based on the target state of each of the plurality of HE systems.

Clause M2. The method of clause M1, wherein the set of HE system rules includes:

rules specifying conditions for activating or deactivating ones of the plurality of HE systems; and one or more of:

rules specifying which of the plurality of HE systems can be active with each other;

rules specifying which of the plurality of HE systems must be active with another of the plurality of HE systems; or rules specifying which of the plurality of HE systems cannot be active with each other.

Clause M3. The method of clause M1 or M2, wherein the rules specifying conditions for activating or deactivating the ones of the plurality of HE systems include one or more of:

rules specifying a sequence for activating or deactivating a subset of the plurality of HE systems; or rules specifying timing requirements related to activating or deactivating the ones of the plurality of HE systems.

Clause M4. The method of any of clauses M1-M3, further comprising:

receiving a schedule of tasks to be performed on the aircraft;

wherein determining the target state of each of the plurality of HE systems is further based on the schedule of tasks.

Clause M5. The method of any of clauses M1-M4, wherein the rules specifying conditions for activating or deactivating the ones of the plurality of HE systems are based on one or more identified tasks.

Clause M6. The method of any of clauses M1-M5, wherein active control of the plurality of HE systems is conditioned on a determination that the aircraft is in a ground state.

Clause M7. The method of any of clauses M1-M6, further comprising:

sending an alert to a user device, wherein the alert is based on one or more of the target state of one or more of the plurality of HE systems, the one or more control actions, or a conflicting activation or deactivation of an HE system.

Clause M8. The method of any of clauses M1-M7, further comprising:

receiving a command from a user device relating to one of the plurality of HE systems; and modifying one of the one or more control actions based on the command.

Clause M9. The method of any of clauses M1-M8, further comprising:

providing information regarding the present state of the plurality of HE systems for display on a user device.

Clause M10. The method of any of clauses M1-M9, wherein the plurality of HE systems include one or more HE systems selected from a group including an electrical system, a hydraulic system, a propulsion system, a flight deck power system, a payload and ordinance system, or a fuel system.

Clause S1. A high-energy management system controller comprising:

a processor; and memory coupled to the processor, the memory comprising instructions which, when executed by the processor, cause the high-energy management system controller to perform operations comprising:

receiving sensor data from a plurality of high-energy (HE) systems, wherein each of the plurality of HE systems is located in an aircraft;

determining a present state of each of the plurality of HE systems based on the sensor data;

determining a target state of each of the plurality of HE systems based on the present state of each of the plurality of HE systems and a set of HE system rules; and automatically generating one or more control actions to effect control of one or more of the plurality of HE systems based on the target state of each of the plurality of HE systems.

Clause S2. The high-energy management system controller of clause S1, wherein the set of HE system rules includes:

rules specifying conditions for activating or deactivating ones of the plurality of HE systems; and one or more of:

rules specifying which of the plurality of HE systems can be active with each other;

rules specifying which of the plurality of HE systems must be active with another of the plurality of HE systems; or rules specifying which of the plurality of HE systems cannot be active with each other.

Clause S3. The high-energy management system controller of clause S1 or S2, wherein the rules specifying conditions for activating or deactivating the ones of the plurality of HE systems include one or more of:

rules specifying a sequence for activating or deactivating a subset of the plurality of HE systems; or rules specifying timing requirements related to activating or deactivating the ones of the plurality of HE systems.

Clause S4. The high-energy management system controller of any of clauses S1-S3, wherein the instructions, when executed, cause the high-energy management system controller to perform further operations comprising:

receiving a schedule of tasks to be performed on the aircraft;

wherein determining the target state of each of the plurality of HE systems is further based on the schedule of tasks.

Clause S5. The high-energy management system controller of any of clauses S1-S4, wherein the rules specifying conditions for activating or deactivating the ones of the plurality of HE systems are based on one or more identified tasks.

Clause S6. The high-energy management system controller of any of clauses S1-S5, wherein active control of the plurality of HE systems by the high-energy management system controller is conditioned on a determination that the aircraft is in a ground state.

Clause S7. The high-energy management system controller of any of clauses S1-S6, wherein the instructions, when executed, cause the high-energy management system controller to perform further operations comprising:

sending an alert to a user device, wherein the alert is based on one or more of the target state of one or more of the plurality of HE systems, the one or more control actions, or a conflicting activation or deactivation of an HE system.

Clause S8. The high-energy management system controller of any of clauses S1-S7, wherein the instructions, when executed, cause the high-energy management system controller to perform further operations comprising:
receiving a command from a user device relating to one of the plurality of HE systems; and
modifying one of the one or more control actions based on the command.

Clause S9. The high-energy management system controller of any of clauses S1-S8, wherein the instructions, when executed, cause the high-energy management system controller to perform further operations comprising:
providing information regarding the present state of the plurality of HE systems for display on a user device.

Clause S10. The high-energy management system controller of any of clauses S1-S9, wherein the plurality of HE systems include one or more HE systems selected from a group including an electrical system, a hydraulic system, a propulsion system, a flight deck power system, a payload and ordinance system, or a fuel system.

Clause C1. At least one computer-readable storage medium comprising instructions which, when executed by a processor, cause a high-energy management system to perform operations comprising:
receiving sensor data from a plurality of high-energy (HE) systems, wherein each of the plurality of HE systems is located in an aircraft;
determining a present state of each of the plurality of HE systems based on the sensor data;
determining a target state of each of the plurality of HE systems based on the present state of each of the plurality of HE systems and a set of HE system rules; and
automatically generating one or more control actions to effect control of one or more of the plurality of HE systems based on the target state of each of the plurality of HE systems.

Clause C2. The at least one computer-readable storage medium of clause C1, wherein the set of HE system rules includes:
rules specifying conditions for activating or deactivating ones of the plurality of HE systems; and
one or more of:
rules specifying which of the plurality of HE systems can be active with each other;
rules specifying which of the plurality of HE systems must be active with another of the plurality of HE systems; or
rules specifying which of the plurality of HE systems cannot be active with each other.

Clause C3. The at least one computer-readable storage medium of clause C1 or C2, wherein the rules specifying conditions for activating or deactivating the ones of the plurality of HE systems include one or more of:
rules specifying a sequence for activating or deactivating a subset of the plurality of HE systems; or
rules specifying timing requirements related to activating or deactivating the ones of the plurality of HE systems.

Clause C4. The at least one computer-readable storage medium of any of clauses C1-C3, wherein the instructions, when executed, cause the high-energy management system to perform further operations comprising:
receiving a schedule of tasks to be performed on the aircraft;
wherein determining the target state of each of the plurality of HE systems is further based on the schedule of tasks.

Clause C5. The at least one computer-readable storage medium of any of clauses C1-C4, wherein the rules specifying conditions for activating or deactivating the ones of the plurality of HE systems are based on one or more identified tasks.

Clause C6. The at least one computer-readable storage medium of any of clauses C1-C5, wherein active control of the plurality of HE systems by the high-energy management system controller is conditioned on a determination that the aircraft is in a ground state.

Clause C7. The at least one computer-readable storage medium of any of clauses C1-C6, wherein the instructions, when executed, cause the high-energy management system to perform further operations comprising:
sending an alert to a user device, wherein the alert is based on one or more of the target state of one or more of the plurality of HE systems, the one or more control actions, or a conflicting activation or deactivation of an HE system.

Clause C8. The at least one computer-readable storage medium of any of clauses C1-C7, wherein the instructions, when executed, cause the high-energy management system to perform further operations comprising:
receiving a command from a user device relating to one of the plurality of HE systems; and
modifying one of the one or more control actions based on the command.

Clause C9. The at least one computer-readable storage medium of any of clauses C1-C8, wherein the instructions, when executed, cause the high-energy management system to perform further operations comprising:
providing information regarding the present state of the plurality of HE systems for display on a user device.

Clause C10. The at least one computer-readable storage medium of any of clauses C1-C9, wherein the plurality of HE systems include one or more HE systems selected from a group including an electrical system, a hydraulic system, a propulsion system, a flight deck power system, a payload and ordinance system, or a fuel system.

Clause A1. An apparatus comprising means for performing the method of any of clauses M1-M10.

Examples are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), solid state drive (SSD)/NAND drive controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary examples to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although examples are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the examples. Further, arrangements may be shown in block diagram form in order to avoid obscuring examples, and also in view of the fact that specifics with respect to implementation of such block diagram arrangements are highly dependent upon the platform within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B, or C" may mean A, B, C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. A method of controlling a high-energy management system, comprising:
   receiving sensor data from a plurality of high-energy (HE) systems, wherein each of the plurality of HE systems is located in an aircraft;
   determining a present state of each of the plurality of HE systems based on the sensor data;
   determining a target state of each of the plurality of HE systems based on the present state of each of the plurality of HE systems and a set of HE system rules;
   determining whether the aircraft is on the ground; and
   only when the aircraft is confirmed to be on the ground, automatically generating one or more control actions to effect control of one or more of the plurality of HE systems based on the target state of each of the plurality of HE systems,
   wherein the aircraft is confirmed to be on the ground when it is confirmed to be in a non-operational state not presently engaged in any phase of flight.

2. The method of claim 1, wherein the set of HE system rules includes:
   rules specifying conditions for activating or deactivating ones of the plurality of HE systems; and one or more of:
   rules specifying which of the plurality of HE systems can be active with each other;
   rules specifying which of the plurality of HE systems must be active with another of the plurality of HE systems; or
   rules specifying which of the plurality of HE systems cannot be active with each other.

3. The method of claim 2, wherein the rules specifying conditions for activating or deactivating the ones of the plurality of HE systems include one or more of:
   rules specifying a sequence for activating or deactivating a subset of the plurality of HE systems; or
   rules specifying timing requirements related to activating or deactivating the ones of the plurality of HE systems.

4. The method of claim 3, further comprising:
   receiving a schedule of tasks to be performed on the aircraft;
   wherein determining the target state of each of the plurality of HE systems is further based on the schedule of tasks.

5. The method of claim 4, wherein the rules specifying conditions for activating or deactivating the ones of the plurality of HE systems are based on one or more identified tasks.

6. The method of claim 1, further comprising:
   sending an alert to a user device, wherein the alert is based on one or more of the target state of one or more of the plurality of HE systems, the one or more control actions, or a conflicting activation or deactivation of an HE system.

7. The method of claim 1, further comprising:
   receiving a command from a user device relating to one of the plurality of HE systems; and
   modifying one of the one or more control actions based on the command.

8. The method of claim 1, further comprising:
   providing information regarding the present state of the plurality of HE systems for display on a user device.

9. The method of claim 1, wherein the plurality of HE systems include one or more HE systems selected from a group including an electrical system, a hydraulic system, a propulsion system, a flight deck power system, a payload and ordinance system, or a fuel system.

10. The method of claim 1, wherein the aircraft is confirmed to be in a non-operational state when it is in at least one of maintenance, manufacture, and testing.

11. A high-energy management system controller comprising:
    a processor; and
    memory coupled to the processor, the memory comprising instructions which, when executed by the processor, cause the high-energy management system controller to perform operations comprising:
      receiving sensor data from a plurality of high-energy (HE) systems, wherein each of the plurality of HE systems is located in an aircraft;
      determining a present state of each of the plurality of HE systems based on the sensor data;
      determining a target state of each of the plurality of HE systems based on the present state of each of the plurality of HE systems and a set of HE system rules;
      determining whether the aircraft is on the ground; and
      only when the aircraft is confirmed to be on the ground, automatically generating one or more control actions to effect control of one or more of the plurality of HE systems based on the target state of each of the plurality of HE systems, wherein the aircraft is confirmed to be on the ground when it is confirmed to be in a non-operational state not presently engaged in any phase of flight.

12. The high-energy management system controller of claim 11, wherein the set of HE system rules includes:
rules specifying conditions for activating or deactivating ones of the plurality of HE systems; and
one or more of:
rules specifying which of the plurality of HE systems can be active with each other;
rules specifying which of the plurality of HE systems must be active with another of the plurality of HE systems; or
rules specifying which of the plurality of HE systems cannot be active with each other,
wherein the rules specifying conditions for activating or deactivating the ones of the plurality of HE systems include one or more of:
rules specifying a sequence for activating or deactivating a subset of the plurality of HE systems; or
rules specifying timing requirements related to activating or deactivating the ones of the plurality of HE systems.

13. The high-energy management system controller of claim 12, wherein the instructions, when executed, cause the high-energy management system controller to perform further operations comprising:
receiving a schedule of tasks to be performed on the aircraft;
wherein determining the target state of each of the plurality of HE systems is further based on the schedule of tasks, and
wherein the rules specifying conditions for activating or deactivating the ones of the plurality of HE systems are based on one or more identified tasks.

14. The high-energy management system controller of claim 11, wherein the instructions, when executed, cause the high-energy management system controller to perform further operations comprising:
sending an alert to a user device, wherein the alert is based on one or more of the target state of one or more of the plurality of HE systems, the one or more control actions, or a conflicting activation or deactivation of an HE system;
receiving a command from the user device relating to one of the plurality of HE systems;
modifying one of the one or more control actions based on the command; and
providing information regarding the present state of the plurality of HE systems for display on the user device.

15. The high-energy management system controller of claim 11, wherein the aircraft is confirmed to be in a non-operational state when it is in at least one of maintenance, manufacture, and testing.

16. At least one non-transitory computer-readable storage medium comprising instructions which, when executed by a processor, cause a high-energy management system controller to perform operations comprising:
receiving sensor data from a plurality of high-energy (HE) systems, wherein each of the plurality of HE systems is located in an aircraft;
determining a present state of each of the plurality of HE systems based on the sensor data;
determining a target state of each of the plurality of HE systems based on the present state of each of the plurality of HE systems and a set of HE system rules;
determining whether the aircraft is on the ground; and
only when the aircraft is confirmed to be on the ground, automatically generating one or more control actions to effect control of one or more of the plurality of HE systems based on the target state of each of the plurality of HE systems,
wherein the aircraft is confirmed to be on the ground when it is confirmed to be in a non-operational state not presently engaged in any phase of flight.

17. The at least one non-transitory computer-readable storage medium of claim 16, wherein the set of HE system rules includes:
rules specifying conditions for activating or deactivating ones of the plurality of HE systems; and
one or more of:
rules specifying which of the plurality of HE systems can be active with each other;
rules specifying which of the plurality of HE systems must be active with another of the plurality of HE systems; or
rules specifying which of the plurality of HE systems cannot be active with each other,
wherein the rules specifying conditions for activating or deactivating the ones of the plurality of HE systems include one or more of:
rules specifying a sequence for activating or deactivating a subset of the plurality of HE systems; or
rules specifying timing requirements related to activating or deactivating the ones of the plurality of HE systems.

18. The at least one non-transitory computer-readable storage medium of claim 17, wherein the instructions, when executed, cause the high-energy management system controller to perform further operations comprising:
receiving a schedule of tasks to be performed on the aircraft;
wherein determining the target state of each of the plurality of HE systems is further based on the schedule of tasks, and
wherein the rules specifying conditions for activating or deactivating the ones of the plurality of HE systems are based on one or more identified tasks.

19. The at least one non-transitory computer-readable storage medium of claim 16, wherein the instructions, when executed, cause the high-energy management system controller to perform further operations comprising:
sending an alert to a user device, wherein the alert is based on one or more of the target state of one or more of the plurality of HE systems, the one or more control actions, or a conflicting activation or deactivation of an HE system,
receiving a command from the user device relating to one of the plurality of HE systems;
modifying one of the one or more control actions based on the command; and
providing information regarding the present state of the plurality of HE systems for display on the user device.

20. The at least one non-transitory computer-readable storage medium of claim 16, wherein the aircraft is confirmed to be in a non-operational state when it is in at least one of maintenance, manufacture, and testing.

* * * * *